United States Patent
Charles et al.

(10) Patent No.: US 11,577,795 B2
(45) Date of Patent: Feb. 14, 2023

(54) BUMPER WITH AN INTEGRATED MARKING CELL

(71) Applicant: Airbus SAS, Blagnac (FR)

(72) Inventors: Julien Charles, Toulouse (FR); Guillaume Ferrer, Toulouse (FR)

(73) Assignee: Airbus SAS, Blagnac (FR)

( * ) Notice: Subject to any disclaimer, the term of this patent is extended or adjusted under 35 U.S.C. 154(b) by 942 days.

(21) Appl. No.: 16/400,438

(22) Filed: May 1, 2019

(65) Prior Publication Data

US 2019/0337578 A1 Nov. 7, 2019

(30) Foreign Application Priority Data

May 4, 2018 (FR) ...................................... 1853847

(51) Int. Cl.
| | | |
|---|---|---|
| *B62D 41/00* | (2006.01) | |
| *B60R 19/48* | (2006.01) | |
| *B60R 19/20* | (2006.01) | |
| *B60R 19/18* | (2006.01) | |

(52) U.S. Cl.
CPC ............. *B62D 41/00* (2013.01); *B60R 19/20* (2013.01); *B60R 19/48* (2013.01); *B60R 2019/1866* (2013.01)

(58) Field of Classification Search
CPC ....... B60R 19/023; B60R 19/18; B60R 19/20; B60R 19/48; B62D 41/00
USPC ............................................. 116/32; 293/106
See application file for complete search history.

(56) References Cited

U.S. PATENT DOCUMENTS

| 2,646,016 A | 7/1953 | Wilson |
|---|---|---|
| 3,490,409 A | 1/1970 | Pomeroy et al. |
| 2013/0197717 A1 | 8/2013 | Fraser et al. |

FOREIGN PATENT DOCUMENTS

| DE | 2935786 A | * | 4/1981 | ............. B62D 41/00 |
|---|---|---|---|---|
| GB | 1218046 A | | 1/1971 | |
| JP | H0280467 A | | 3/1990 | |
| KR | 20150097013 A | * | 8/2015 | |
| WO | 0051875 A1 | | 9/2000 | |

OTHER PUBLICATIONS

French Search Report; priority document.

* cited by examiner

*Primary Examiner* — Jason S Daniels
(74) *Attorney, Agent, or Firm* — Greer, Burns & Crain, Ltd.

(57) ABSTRACT

A vehicle bumper comprising at least one part made of resilient material, in the interior of which there is provided at least one marking fluid cell with an opening to the exterior. The opening is closed by a closure device which, under the effect of a pressure applied with a determined intensity, can open up the opening, allowing the marking fluid to access the exterior of the cell through which the marking fluid can flow, and also comprising a securing element configured to secure the at least one part on the vehicle.

11 Claims, 4 Drawing Sheets

BUMPER WITH AN INTEGRATED MARKING CELL

CROSS-REFERENCES TO RELATED APPLICATIONS

This application claims the benefit of the French patent application No. 1853847 filed on May 4, 2018, the entire disclosures of which are incorporated herein by way of reference.

FIELD OF THE INVENTION

The present invention relates to the field of bumpers, and more particularly bumpers of vehicles. More particularly, the present invention concerns bumpers which incorporate a system making it possible to detect an impact of the vehicle on any surface.

BACKGROUND OF THE INVENTION

Collisions can occur between a vehicle of the GSE (Ground Service Equipment) type and an aircraft. However, certain aircraft have areas wherein an impact of this type has an effect on the structure, such as that of the fuselage for example, without this being able to be detected by the naked eye.

An objective of the present invention is to propose a vehicle bumper provided with a system for marking in the event of collision which permits rapid and easy replacement of the system in the event of activation of the marking.

SUMMARY OF THE INVENTION

For this purpose, the present invention proposes a vehicle bumper, comprising at least one part made of resilient material, in the interior of which there is provided at least one marking fluid cell with a direct opening to the exterior, which opening is closed by a closure device which, under the effect of a pressure applied, can open up the opening, allowing the marking fluid to access the exterior of the cell through which it can flow, and in that it also comprises a securing element configured to secure the bumper on the vehicle.

By this means it is sufficient to replace the bumper in order to restore the vehicle function in a manner which is rapid and easy.

The bumper has at least one of the following optional characteristics, taken in isolation or in combination.

The closure device is in the form of two resilient lips superimposed on one another and locked in the constrained position abutting one another, with a pressure applied on the bumper at the lips with a determined minimum intensity ensuring the unlocking, thus allowing the lips to regain a natural position in which the opening of the cell towards the exterior is opened up.

The closure device is in the form of an added-on breakable connection which ensures the closure of the cell, with a pressure with a determined minimum intensity applied on the connection leading to breakage of the connection and to opening up of the opening of the cell towards the exterior.

The cells are distributed transversely on at least part of the width of the bumper.

In the case of at least some of the cells, each cell extends transversely on at least part of the width of the bumper.

The cells which extend transversely have a globally cylindrical form.

Cells are positioned at a plurality of height levels.

The bumper comprises a non-resilient structural part which is secured on the resilient part, and which comprises the securing element on the vehicle.

The present invention also relates to the vehicle provided with a bumper with at least one of the optional characteristics described above, taken in isolation or in combination, with the resilient part being positioned at least partly on the outer peripheral part.

The present invention also relates to a method for marking a surface with which a vehicle, having at least one of the optional characteristics described above, taken in isolation or in combination, enters into collision, and such that, during the impact, the frontal part of the bumper exerts a pressure on the cell(s), thus permitting the flow of the marking fluid through the opening(s) opened up towards the exterior.

BRIEF DESCRIPTION OF THE DRAWINGS

Other objectives, advantages and characteristics of the invention will become apparent from reading the following description, provided by way of non-limiting example, with reference to the appended drawings in which.

DETAILED DESCRIPTION OF THE PREFERRED EMBODIMENTS

A vehicle 2 described by way of illustration in the following description is a vehicle of the ground service equipment type. A vehicle of this type can be, for example, a towing vehicle for displacement of the aircraft on the ground, a vehicle for transport of a luggage conveyor, a luggage transport vehicle or luggage container vehicle, a freight or passenger vehicle, a vehicle for transport of the airport or company personnel, a tanker to supply the aircraft with water, fuel or the like, a catering vehicle for loading and unloading of trolleys, for example, a vehicle for replenishment of drinking water or the like, a toilet-emptying vehicle, a vehicle for transport of the staircase for embarkation/disembarkation of passengers, etc. The present invention can relate to any other type of vehicle.

In the description, the term "transverse" is understood to be in the direction of the width of the vehicle, and the term "longitudinal" is understood to be a direction perpendicular to the transverse direction, i.e., in the direction of the length of the vehicle. The direction which is perpendicular to both the transverse and longitudinal directions is designated by the expression "in height" and corresponds to the vertical direction.

Figure 1:
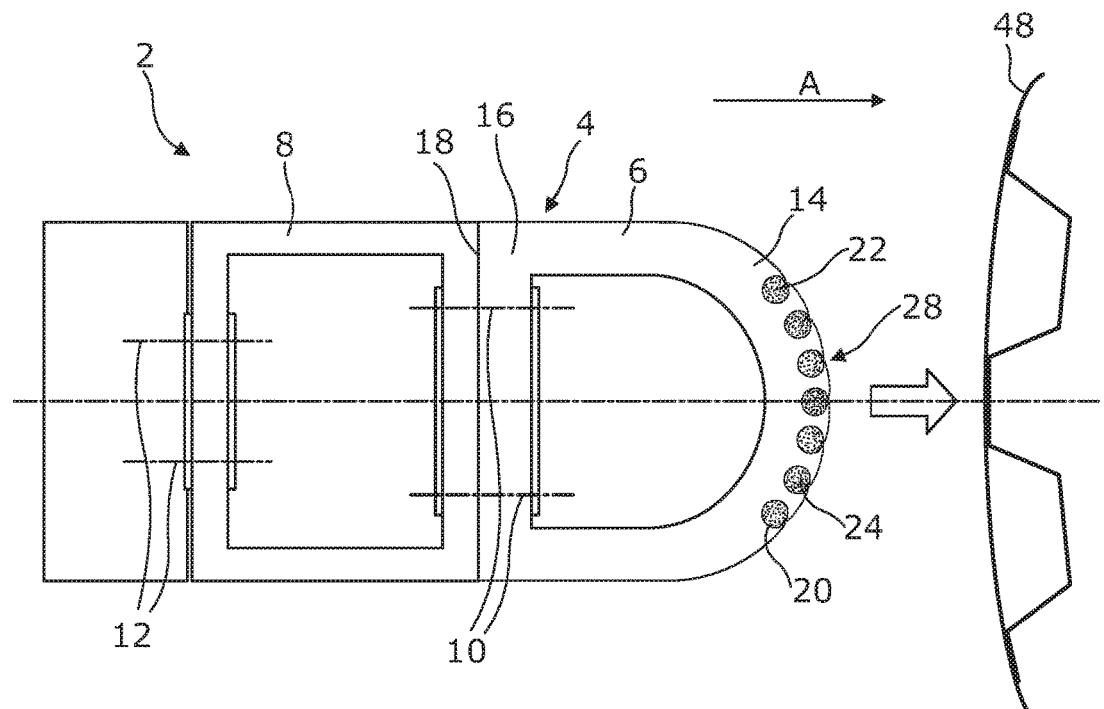
FIGS. 1 to 3 represent simplified schematic views in vertical longitudinal cross-section of a ground service equipment vehicle respectively approaching an aircraft fuselage, in collision with the latter, moving away from the the fuselage after collision, and provided with a bumper according to the present invention.

The terms "front" and "rear" are understood to be relative to the direction of advance of the vehicle, this direction being represented by an arrow A in FIG. 1.

Figure 2:
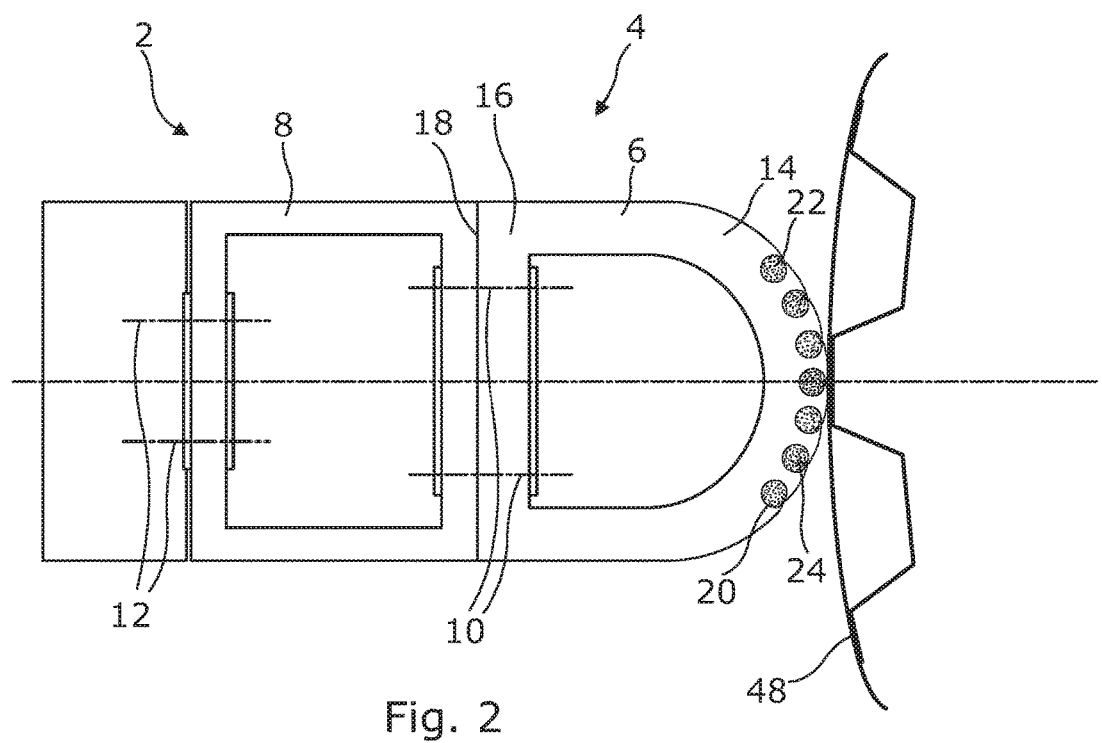
Figure 3:
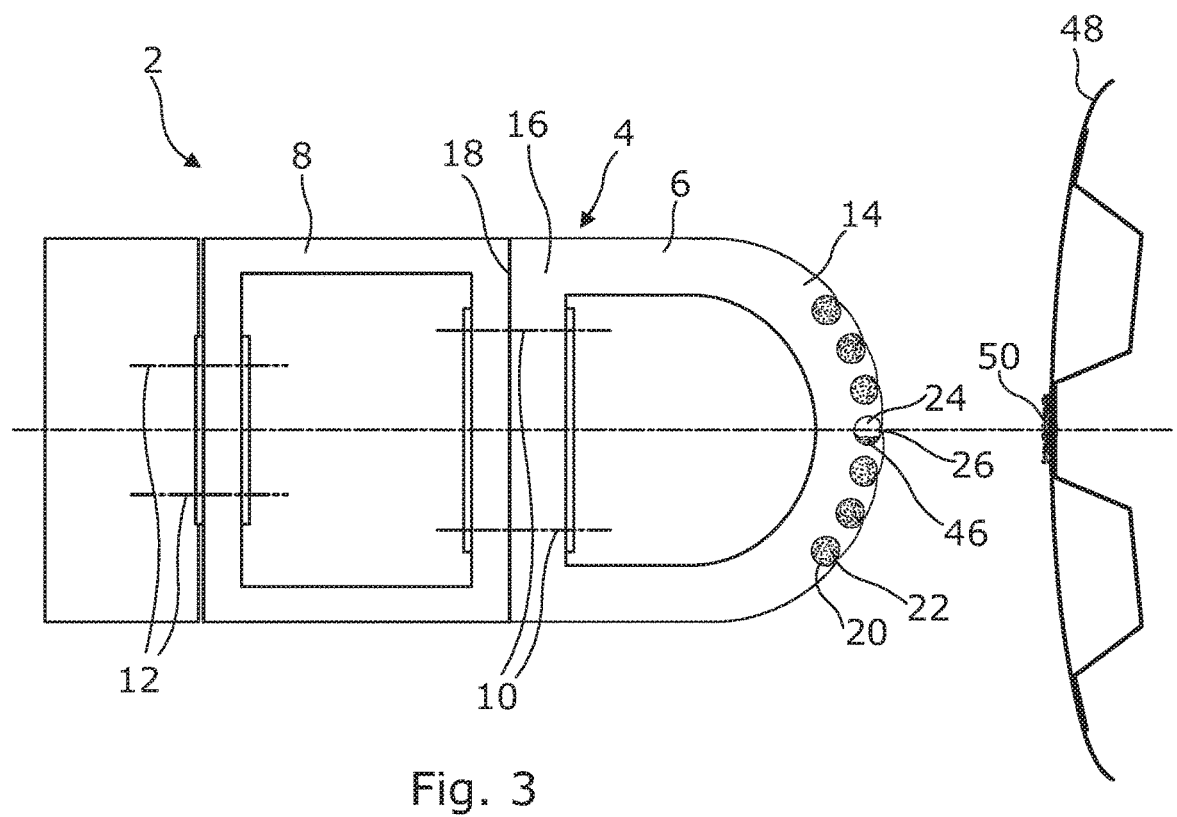

According to the embodiment illustrated in FIGS. 1 to 3, the vehicle 2 comprises a bumper 4 with at least one resilient part 6. It also comprises a non-resilient part 8 constituting a structural framework which participates in the rigidity and transmission of the forces, and on which the resilient part 6 is secured by any type of means. The non-resilient part 8 will be known hereinafter as the structural part. The resilient part 6 is positioned at least partly on the outer peripheral part at the bumper. In other words, the resilient part 6 is positioned longitudinally at least partly at the outer extreme level of the bumper. In the embodiment illustrated, broken lines symbolize a screw junction of a conventional type; any other type of securing can be used. In the embodiment illustrated, the securing of the resilient part 6 on the structural part 8 is removable. The resilient part 6 can easily be separated from the structural part 8 without damaging the latter, and removed from the vehicle 2. In the present case, this is a junction 10 by means of screws, and it is therefore sufficient to carry out simple unscrewing in order to separate the resilient part from the vehicle 2. Similarly, as shown by FIGS. 1 to 3, the structural part 8 is itself secured by any type of securing element on the bodywork of the vehicle 2, and, for example, in the same manner as for the resilient part 6; broken lines symbolize a junction 12 by means of screws of a conventional type, permitting easy removal of the structural part 8 with or without the resilient part 6, depending on whether the latter itself has been removed or not.

The resilient part 6 of the bumper 4 serves the purpose of damping frontal impacts by means of its resilient deformation throughout the period of stress; if the impact has not been too violent, it then regains its form and initial dimensions, having prevented the vehicle from being damaged.

By way of illustration, the structural part 8 can be made of metal, and the resilient part 6 can be constituted by a material of the rubber type.

According to another embodiment, the bumper 4 has a resilient part 6, but no non-resilient part. The resilient part 6 is secured directly on the bodywork of the vehicle 2. The bodywork of the vehicle then constitutes the structural part 8.

FIGS. 1 to 3 represent longitudinal cross-sections of the vehicle 2 along a vertical central plane X-X (represented in FIGS. 8 and 9) of the vehicle. Throughout the remainder of the description, it is considered that the vehicle 2 is supported on a horizontal ground, and that any direction perpendicular to the ground is vertical. In a conventional manner, the bumper 4 extends transversely at the front of the vehicle 2 over most of its width, or even beyond its width, having curvatures on both sides of the vehicle in order to follow its contours.

As shown in FIGS. 1 to 4 and 8, the resilient part 6 has a hollow curved form. According to another embodiment, it could be solid. The resilient part 6 has a curved frontal portion 14 with a convex cross-section. In the form illustrated, it also has a flat rear portion 16 known as the base. The resilient part 6 has a cross-section in the form of a D; the base 16 forms the linear bar of the D, and is designed to be applied against a flat surface 18 of the structural part 8, in order to be secured on it. The frontal portion 14 of the resilient part 6 incorporates at least one marking fluid 22 cell 20. The cell 20 has any type of form which makes it possible to provide a cavity 24 for storage of the marking fluid. According to one embodiment, the frontal portion 14 of the resilient part 6 has a plurality of cells 20 extending transversely on the width of the bumper in the transverse direction. The cells extend for example over more than 50% of the width of the bumper, or even over more than 80% of the width of the bumper (as can be seen in the example represented in FIG. 9). The cells have a globally cylindrical form with a circular cross-section and an axis in the transverse direction along the bumper. The cells could have any other type of form, and, for example, an oval cross-section or the equivalent, or any other type of form, for example spherical or the like.

Figure 9:
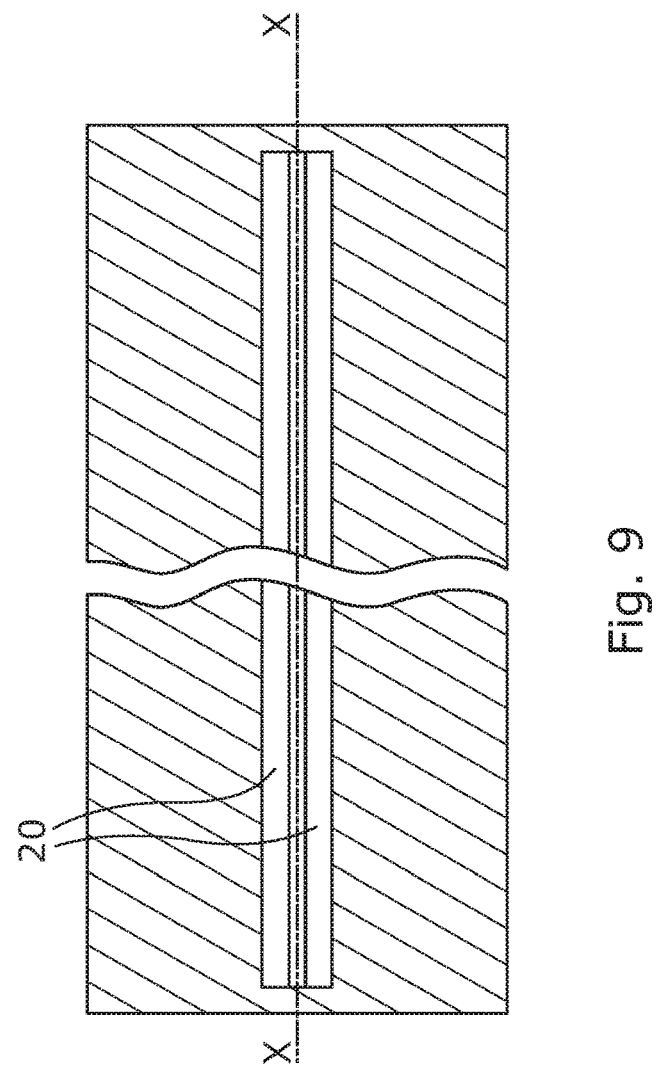
FIG. 9 represents a simplified schematic view in cross-section along the axis A-A of the resilient part of the bumper according to FIG. 8.
Figure 8:
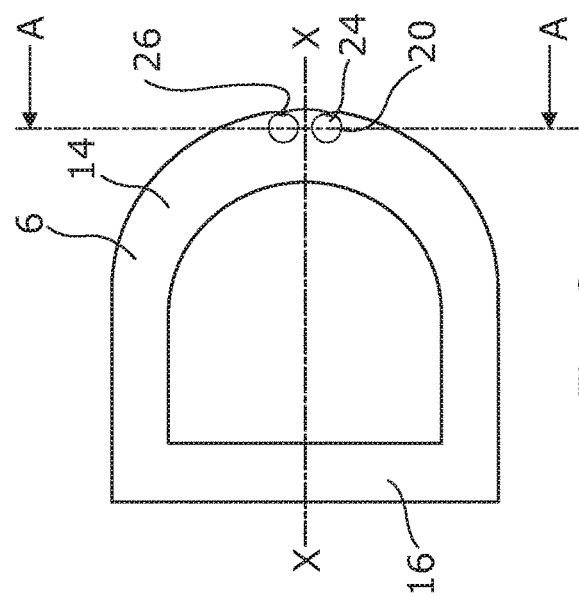
FIG. 8 represents a simplified schematic view in vertical longitudinal cross-section of the resilient part of the bumper according to FIG. 4.

The cells 20 are distributed over an area which extends in height parallel to one another, as shown by the cross-section A-A in FIG. 9. They are concentrated in the front extreme part of the frontal portion 14. A single cell 20 is provided on a single longitudinal axis. In fact, the cell 20 has an opening towards the exterior: also because of this opening towards the exterior, an assembly of cells cannot be provided further back longitudinally, and known as second-level cells, unless a connection is created with the cells which communicate with the exterior, and are then known as first-level cells, or unless a channel is created which allows the second-level cell in the thickness of the resilient part to communicate with the exterior. As shown in FIGS. 1 to 4 and 8 and 9, cells 20 are positioned adjacent to one another in the direction of the height, such that a space subsists between them. In the form illustrated, they are distributed symmetrically relative to a central horizontal plane X-X (FIGS. 8 and 9). They extend in height over at least part of the extent of the curved surface of the frontal portion 14. In the form illustrated in FIG. 1, they extend over more than half the height of the extent of the curved surface of the frontal portion 14.

As shown in FIG. 9, and in particular in the cross-section A-A, because of the cylindrical form, the cells 20 extend in the transverse direction over more than half the width of the resilient part, and, in the case illustrated, over more than 80% of the width of the resilient part. According to one embodiment, in the case when the resilient part has three branches, one designed to be placed at the front of the vehicle, and the other two at the lateral level on both sides of the so-called central branch, the transverse ends of the cell 20 are situated only on the central branch of the resilient part. According to other embodiments, the cells can extend as far as into the lateral branches; the transverse ends of the cell are then situated on the lateral branches.

At least some of the cells 20, or even all of them, as in the example illustrated, have a direct opening 26 towards the exterior. The term "direct" means that the interior of the cell is put into communication with the exterior by means of a simple opening 26 in the envelope of the cell. The cells 20 are thus neither integrated completely in the interior of the resilient part, which would require a very substantial impact in order to allow the fluid to be released from the cells, nor completely on the exterior of the resilient part, which would place them in direct contact with the exterior environment, and expose them to all types of aggression (friction, accidental blow, etc.), in cases when it is not desirable for the fluid to be poured out, for example.

Figure 6:
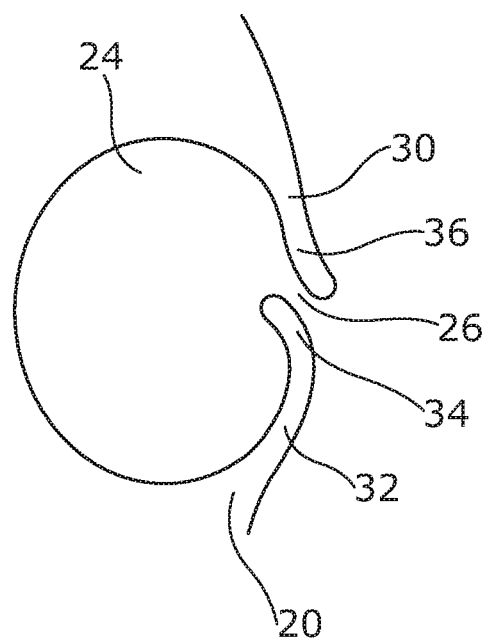

In the particular embodiment with a cross-section in an enlarged view in FIG. 6, the opening 26 of the cell 20 towards the exterior is direct. The opening 26 is closed by a closure device 28 which, under the effect of a pressure applied on the closure device, can open up the opening, thus allowing the marking fluid access to the exterior of the cell, through which it can flow.

Numerous types of devices 28 for closure of the cell can be envisaged, examples of which are provided hereinafter.

According to the form illustrated in FIGS. 1 to 6, 8 and 9, the closure device 28 is integrated in the resilient part 6. Since the cell 20 is open towards the exterior, two lips 30, 32 are formed respectively on both sides of the opening 26, i.e., an upper lip 30 and a lower lip 32. In the natural position represented in FIG. 6, the lips 30, 32 are spaced from one another in order to form the opening 26 towards the exterior. The lips 30, 32 have, respectively in one case, a curvature 34 which bends the lip concerned towards the interior of the cell, and, in the other case, a curvature 36 which bends the lip concerned towards the exterior. The lower 32 and upper 30 lips are superimposed spaced from one another. In the example illustrated, the lower lip 32 is curved towards the interior, and the upper lip 30 is curved towards the exterior.

Figure 4:
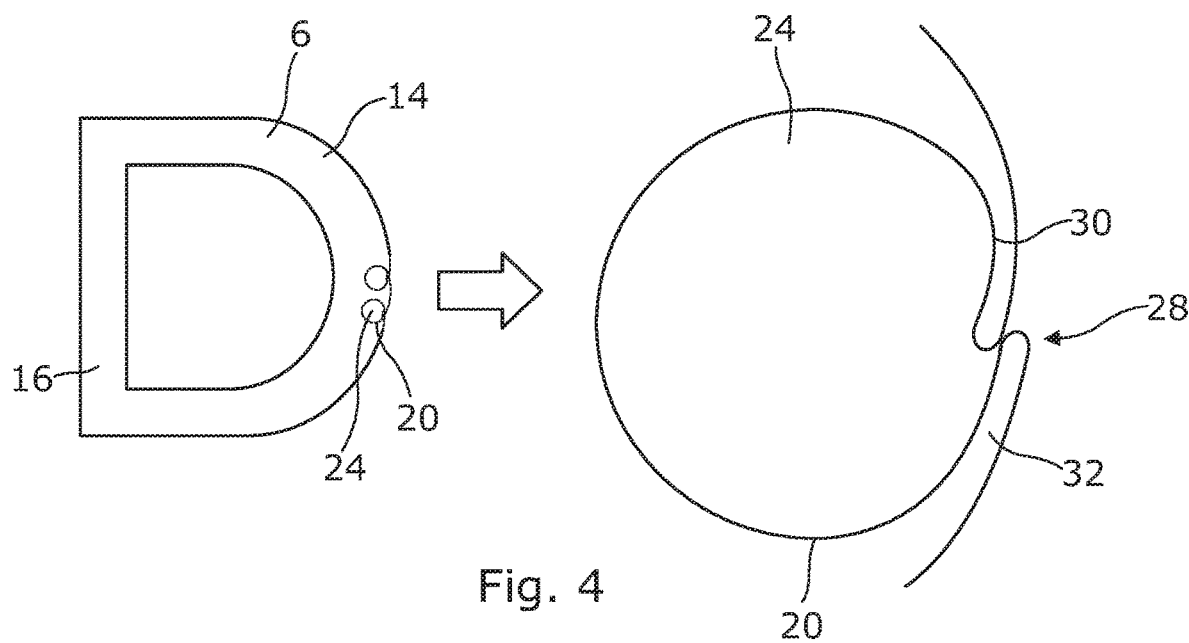
FIG. 4 represents a simplified schematic view in vertical longitudinal cross-section of the resilient part of the bumper according to the embodiment in FIGS. 1 to 3, in which only two cells are represented in the closed position, i.e. before any collision, as well as an enlarged view of a cell.

When the cells are closed, the lip 30 for curvature towards the exterior is placed in the interior of the lip 32 for curvature towards the interior, as shown by FIG. 4. The lips 30, 32 are then in contact; since the lips attempt to regain their natural position, they are supported against one another, abutting one another. The lip 30 which is bent towards the interior attempts to move towards the exterior, and the lip 32 which is bent towards the exterior attempts to move towards the interior. The lips are constrained in the closure position locked by one another, thus closing the opening 26 and the cavity 24.

Figure 5:
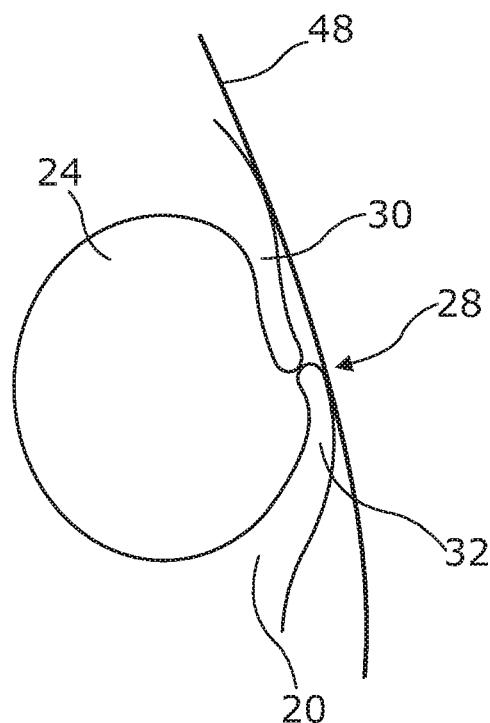
FIGS. 5 and 6 represent simplified schematic views in vertical longitudinal cross-section of a cell of the resilient part, respectively during a collision with an aircraft fuselage, and after collision with the the fuselage.

As represented in FIG. 5, it is necessary to apply a pressure of a determined minimum intensity on the outer surface of the resilient part at the lips 30, 32 in order to release the lips, and allow them, by means of resilience, to regain their natural position in which the opening 26 of the cell towards the exterior is opened up.

Figure 7:
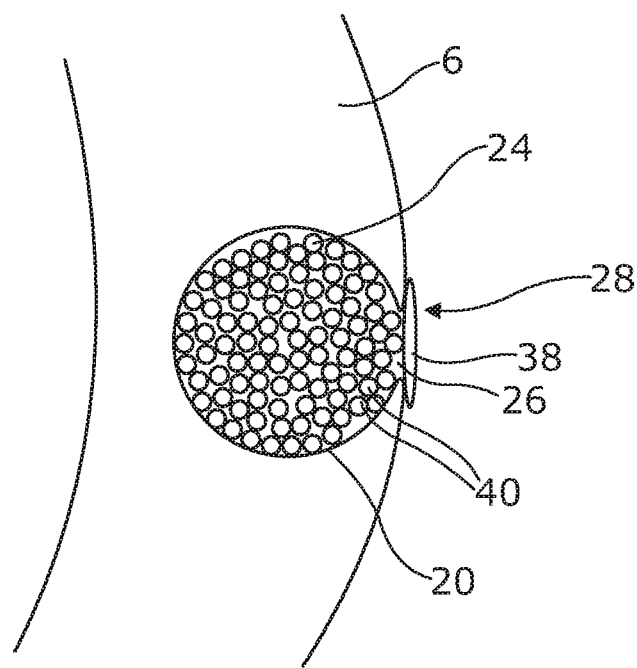
FIG. 7 represents a partial simplified schematic view in vertical longitudinal cross-section of the resilient part of a bumper at a marking fluid cell according to another embodiment.

According to another possible embodiment illustrated in FIG. 7, the closure device 28 is not an integral part of the resilient part, and comprises a connection 38 with any type of form, i.e., a strip, a pellet or the like, which connects the ends of the cell at the opening 26. The connection 38 is made of a different material which does not need to be resilient, and which is thus selected in an appropriate manner in order to be breakable. When a pressure with a determined minimum intensity is applied to the resilient part at the connection 38, it breaks and opens up the opening 26.

Any other embodiment of the closure device 28 is possible, for example of the type which can be retracted, folded back, etc.

The marking fluid 22 is constituted by any type of fluid which makes it possible to leave a trace on the surface onto which it is poured. The cell 20 has a form, and the fluid has a viscosity, such that the fluid 22 is at least partially discharged from the cell when the opening 26 is opened up. As shown by FIG. 3, a residue 46 may subsist in the bottom of the cell.

Alternatively, as shown in FIG. 7, the fluid 22 can be contained in balls 40 which are accommodated in the interior of the cell 20. Irrespective of the embodiment of the cells, the balls break under the determined pressure.

The marking fluid 22 is preferably washable, such as to be able to be removed subsequently from the surface onto which the marking fluid has been poured, once the impact has been detected, displayed and processed. If the collision has not caused any damage, the impacted vehicle can thus be put back into service immediately.

The marking fluid 22 can comprise, for example, a washable paint with viscosity selected according to the different parameters listed above. However, any other type of fluid could be suitable, such as a washable ink, for example.

The marking fluid 22 according to a particular embodiment can have properties of luminescence which make it possible to detect the impact in the dark.

The system functions as follows:

As shown in FIG. 2, when the vehicle 2 enters into collision with a surface, and, for example, when a ground service equipment vehicle 2 enters into collision with the fuselage 48 of an aircraft, if the collision is of an intensity which is liable to give rise to damage on the fuselage 48 of the aircraft, the closure device 28 of the cells 20 opens up the opening 26.

In the case of the lips 30, 32 which are integrated in the resilient part 6 and are represented in FIGS. 4 to 6, the lips 30, 32 are thrust towards the interior of the cell, thus moving them apart from one another: since the lips 30, 32 are no longer abutting one another, they therefore open up the opening 26, and the marking fluid 22 is discharged, passing via the opening 26 in order to spread onto the surface against which the vehicle has entered into collision.

In the case of the breakable connection represented in FIG. 7, because of the intensity of the collision, the connection 38 breaks and opens up the opening 26 through which the marking fluid is poured onto the surface against which the vehicle has entered into collision.

The marking fluid 22 has properties such that it leaves a visible trace 50 on the surface in question. When the vehicle moves away from the surface (FIG. 3), the surface is marked, and the impact is thus visible to the naked eye. The impacted area is delimited, and it can be verified very rapidly whether the surface has been damaged. The fluid can then be removed from the surface in order to allow it to be treated, or, in the example illustrated, to put the aircraft back into service immediately in the case when no damage has been found.

The structure of the fuselage may be damaged and deformed locally: it is necessary to carry out a repair locally, and the impacted area is located rapidly.

Since at least some of the cells have been emptied with the impact, the bumper can easily be restored by replacing the resilient part. In the example illustrated, it is sufficient to separate the resilient part 6 from the structural part 8 by unscrewing it, and to replace it with a new resilient part 6 which is ready to use. Thus, the restoration of the bumper is rapid and easy.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A bumper for a vehicle, comprising:
   at least one part made of resilient material configured to dampen vehicle impacts by resilient deformation, the at least one part made of resilient material comprising an interior with at least one marking fluid cell with a direct opening to an exterior of the at least one marking fluid cell,
   a closure device configured to close the direct opening which, under an effect of a pressure applied to the closure device, opens up the direct opening, allowing marking fluid in the at least one marking fluid cell to access the exterior of the at least one marking fluid cell through which the marking fluid can flow, and
   a securing element configured to secure the at least one part on said vehicle.

2. The bumper according to claim 1, wherein the closure device is in a form of two resilient lips superimposed on one another and locked in a constrained position abutting one another, with a pressure applied on the bumper at the lips with a determined minimum intensity ensuring the unlocking, thus allowing the lips to regain a natural position in which the direct opening of the at least one marking fluid cell towards the exterior is opened up.

3. The bumper according to claim 1, wherein the closure device is in a form of an added-on breakable connection which ensures the closure of the at least one marking fluid cell, with a pressure with a determined minimum intensity applied on the connection leading to breakage of the connection and to opening up of the direct opening of the at least one marking fluid cell towards the exterior.

4. The bumper according to claim 1, wherein the at least one marking fluid cell comprises a plurality of cells which are distributed transversely on at least part of a width of the bumper.

5. The bumper according to claim 1, wherein the at least one marking fluid cell comprises a plurality of cells, and in a case of at least some of the cells, each cell extends transversely on at least part of a width of the bumper.

6. The bumper according to claim 5, wherein the cells which extend transversely have a globally cylindrical form.

7. The bumper according to claim 1, wherein the at least one marking fluid cell comprises a plurality of cells, and wherein the cells are positioned at a plurality of height levels.

8. The bumper according to claim 1, wherein the bumper comprises a non-resilient structural part secured on the at least one part made of resilient material and which comprises the securing element to secure the at least one part on said vehicle.

9. A vehicle provided with a bumper according to claim 1, with the at least one part made of resilient material being positioned at least partly on an outer peripheral part of the bumper.

10. A method for marking a surface with which a vehicle according to claim 9 enters into collision, comprising the step:
    exerting a pressure on the at least one cell during the collision with the outer peripheral part of the bumper, thus permitting the flow of the marking fluid through the at least one opening opened up towards the exterior.

11. A bumper for a vehicle, comprising:
    at least one part made of resilient material, in an interior of which there is provided at least one marking fluid cell with a direct opening to an exterior of the marking fluid cell,
    a closure device configured to close the opening which, under an effect of a pressure applied, opens up the opening, allowing marking fluid in the at least one marking fluid cell to access the exterior of the at least one marking fluid cell through which the marking fluid can flow, and
    a securing element configured to secure the at least one part on said vehicle,
    wherein the closure device is in a form of two resilient lips superimposed on one another and locked in a constrained position abutting one another, with a pressure applied on the bumper at the lips with a determined minimum intensity ensuring the unlocking, thus allowing the lips to regain a natural position in which the direct opening of the at least one marking fluid cell towards the exterior is opened up.

* * * * *